United States Patent [19]
Bushnell et al.

[11] Patent Number: 5,615,840
[45] Date of Patent: Apr. 1, 1997

[54] FISHING REEL WITH DRAG SYSTEM

[75] Inventors: Raymond B. Bushnell, Oregon City; William H. Evilsizer; Paul D. Henderson, both of Beaverton, all of Oreg.; Scotte L. Hughes, Vancouver, Wash.

[73] Assignee: Astro Tool Corp., Beaverton, Oreg.

[21] Appl. No.: 234,655

[22] Filed: Apr. 28, 1994

[51] Int. Cl.$^6$ ................................................ A01K 89/02
[52] U.S. Cl. .................................................. 242/301
[58] Field of Search ................................. 242/285, 295, 242/301, 307

[56] References Cited

U.S. PATENT DOCUMENTS

| | | |
|---|---|---|
| 1,581,661 | 4/1926 | Russell et al. ............................ 242/301 |
| 2,574,718 | 11/1951 | Swigerd . |
| 2,903,201 | 9/1959 | Sarah . |
| 3,322,369 | 5/1967 | Haenelt ................... 242/301 X |
| 3,434,676 | 3/1969 | Bogue . |
| 3,532,288 | 10/1970 | Di Cicco ............................ 242/301 X |
| 3,565,224 | 2/1971 | Argereu . |
| 3,652,031 | 3/1972 | Kosek . |
| 3,778,001 | 12/1973 | Hull ..................................... 242/301 X |
| 3,986,679 | 10/1976 | McMickle ............................ 241/301 X |
| 4,196,871 | 4/1980 | Kobayashi ........................ 241/301 X |
| 4,657,201 | 4/1987 | Munroe . |
| 4,750,687 | 6/1988 | Sievert et al. ........................... 242/295 |

*Primary Examiner*—Daniel P. Stodola
*Attorney, Agent, or Firm*—Robert L. Harrington

[57] ABSTRACT

A fishing reel comprising a circumferential drag system including a drum structure within which an expansion member rests. The expansion member carries at its circumference an O-ring brought against the interior surface of the drum structure upon expansion of the expansion element. In this manner, controlled adjustment of the radially outward expansion element establishes a given magnitude drag coefficient for the drag system.

7 Claims, 3 Drawing Sheets

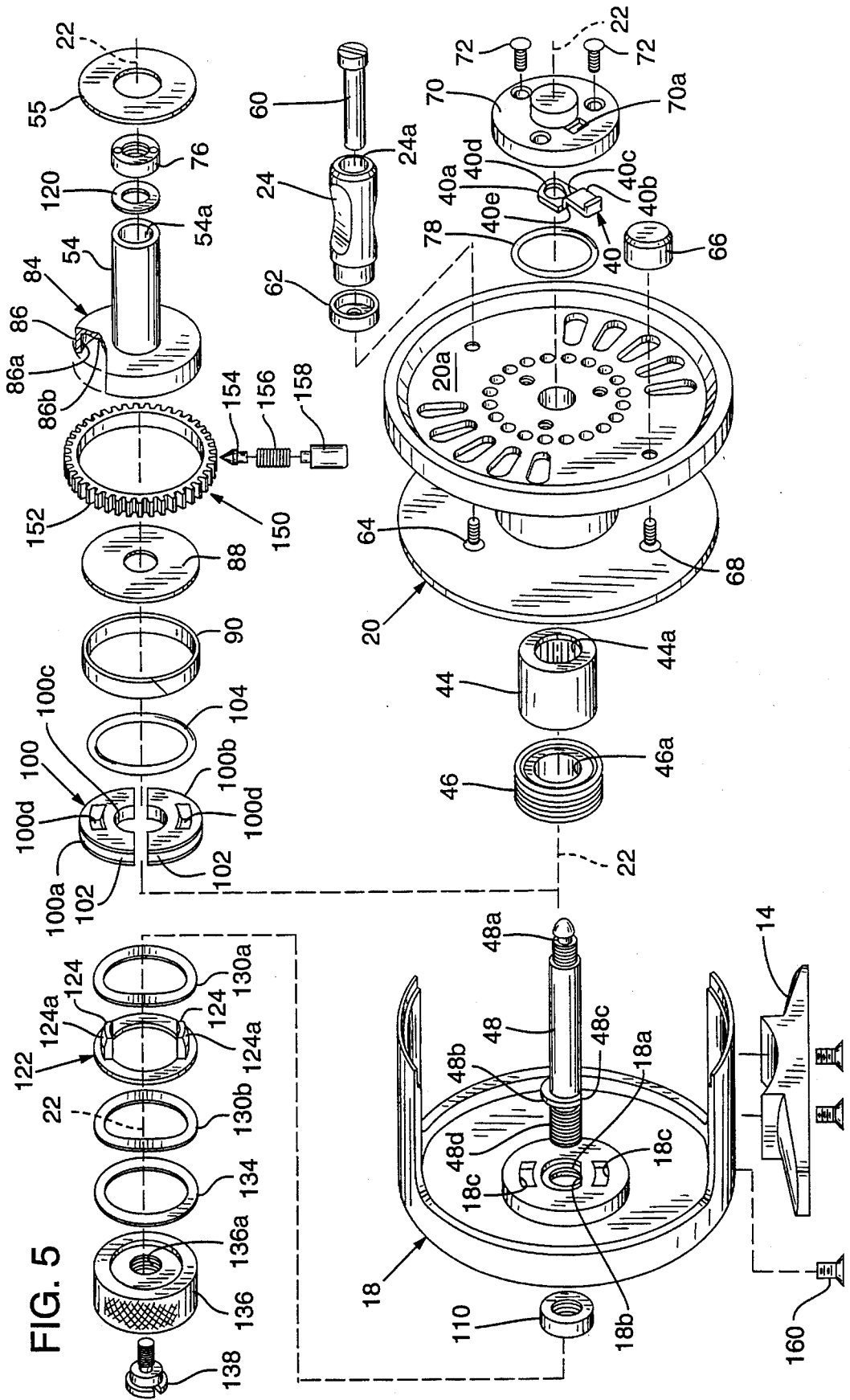

FISHING REEL WITH DRAG SYSTEM

BACKGROUND OF THE INVENTION

The present application relates generally to sport fishing equipment, and particularly to a drag system for a fishing reel.

Important characteristics of a fishing reel drag system include an ability to recover from emersion, i.e., return to an established drag setting following dowsing, an ability to apply appropriate drag to the fishing line in response to a deployment force, and an ability to resist fatigue during extended use. Unfortunately, most fishing reel drag systems fall short of fully satisfying these important operating criteria.

Fishing reel drag systems use friction to develop a reactive drag force against line windout. Traditionally, drag systems provide an adjustable frictional relationship between elements of the fishing reel. For example, one cork element moves with the fishing reel spool during windout or windin. A second cork element remains stationary relative to the fishing reel housing. The cork elements are adjustably urged together to establish a given drag or resistance to rotation of the fishing reel spool. The magnitude of drag developed against line windout is set according to equipment used, prevailing conditions, and user preference. When the reactive drag force is excessive, however, the fishing reel drag system develops excess line tension in response to a strong deployment force, e.g., a large fish on, and can result in a broken fishing rod tippet at the strike or on the initial run following strike.

Existing drag systems lack for failure to avoid sudden excess line tension during initial application of a deployment force, e.g., fish on. The drag system reacts to a deployment force by providing a reactive force on the fishing line. A deployment force below a given drag threshold will not windout line, but once exceeding this drag threshold the fishing reel spool begins to windout fishing line. Line tension is dictated by the deployment force until the drag system allows windout. During windout, line tension is limited by the reactive drag force produced by the drag system, i.e., line tension is a function of the drag setting during windout.

By adjusting the amount of friction produced by the drag system, i.e., by adjusting the drag setting, maximum line tension is limited to a given magnitude. Before windout begins, however, the drag system produces a large reactive force as it overcomes the static friction of the drag system. The large reactive force produces a corresponding large magnitude line tension. As windout commences, the drag system produces a relatively lesser magnitude reactive force, being derived then from dynamic friction within the drag system. As may be appreciated, the relatively lesser magnitude reactive force during windout produces a corresponding lesser magnitude line tension.

To limit line tension absolutely below a given magnitude, the drag setting must be set such that its initial relatively larger magnitude reactive force corresponds to the desired maximum line tension allowed. Unfortunately, such a setting may be inappropriate during windout, i.e., such a setting may provide insufficient drag during windout. The drag setting is, therefore, a compromise somewhere in a range between that appropriate for windout and that appropriate at the onset of windout. As a result, one must accept more risk of lost fish or broken tippets when the drag system is set more appropriately for windout and less appropriately for the onset of windout.

Thus, conventional drag systems suffer due to a large difference in line tension developed in response to a given line deployment force.

Cork material has a relatively high frictional coefficient of drag. To make matters worse, cork has often been coated in an attempt to make the cork more water resistant. Because cork quickly losses its effectiveness, i.e., provides substantially less drag, when exposed to water, a conventional fishing reel becomes virtually worthless for a time following unintended emersion.

Another problem found in traditional fishing reels is that of drag fatigue, i.e., the drag system losing its ability to provide a consistent magnitude drag at a given setting when used heavily for extended periods, e.g., all day. Many drag systems fatigue during use and provide lesser and lesser magnitude drag. As may be appreciated, a more consistent application of drag force is desirable throughout the day for improved drag performance.

Accordingly, it is often necessary to carry several fishing reels during a fishing excursion in the event that one fishing reel gets wet or becomes fatigued and thereby loses an ability to provide appropriate reactive drag in response to a line deployment force. Even with multiple reels, one must deal with the problem of large variation in line tension resulting from an inability of the drag system to provide consistent line tension in response to a given magnitude line deployment force.

It would be desirable, therefore, to provide in a fishing reel an improved drag system not contributing to sudden large variation in line tension during initial fish strike or initial run. A fishing reel should be effective even following complete emersion in water, quickly recovering to provide consistent reactive drag at a given drag setting. Finally, a fishing reel should not fatigue during use, making it available for use throughout an extended fishing excursion.

SUMMARY OF THE INVENTION

In accordance with the present invention, an improved drag system includes a drag housing defining the inner surface of a drum element. Within the drum element, a pair of expansion members reside with intervening frictional material provided between the expansion members and the inner surface of the drum structure. The drag system further includes an adjustment portion bearing against the expansion members in such manner as to separate the expansion members toward the inner surface of the drum structure thereby capturing said frictional materials between said expansion members and said inner surface. The extent to which said expansion members are separated determines the magnitude of drag provided by the drag system.

In a preferred embodiment of the present invention, the frictional material interposed between the expansion members and the inner surface of the drum housing include an O-ring and a low friction drag strip. The O-ring provides a reverse bias collapsing force on the expansion members and bears directly against the drag strip captured between the O-ring and the inner surface of the drum housing.

Also in accordance with a preferred embodiment of the present invention, the adjustment portion of the drag system of the present invention includes a spreader element including surfaces angled relative to a central axis of the drum structure. The expansion elements include corresponding angled surfaces whereby upon driving the spreader element into the expansion members the expansion members separate under the influence of the engaged angled surfaces. By withdrawing the spreader element the expansion elements contract under the influence of the surrounding O-ring.

Overall, the drag system provides consistent line tension through initial onset of a deployment force and during windout of fishing line. Accordingly, an established drag setting accurately reflects both the drag conditions desired during initial windout and during windout. As a result, the user can adjust the drag setting to a desired setting without compromise, i.e., without setting the drag system to an intermediate value between that desired under dynamic friction conditions and that desired under static friction conditions.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 5 is an exploded perspective assembly view of the fishing reel of FIG. 1 illustrating each component thereof.

DETAILED DESCRIPTION OF THE PREFERRED EMBODIMENT

Figure 1:
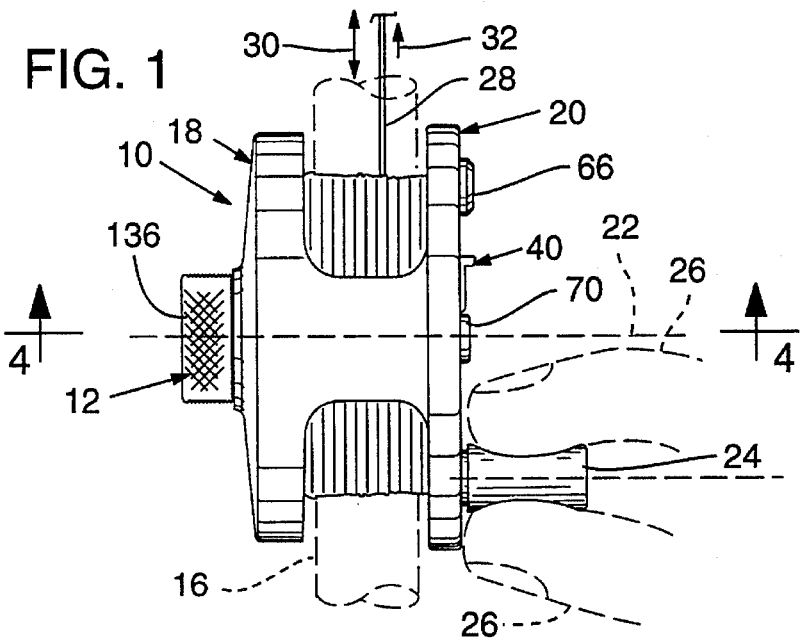
FIG. 1 illustrates a fly fishing reel including a drag system according to the present invention.

The preferred embodiment of the invention as illustrated in the drawings comprises generally a drag system exhibiting the desirable characteristic of substantially consistent line tension in response to a given magnitude deployment force through onset of the deployment force and during line windout. The drag system also exhibits the desirable characteristic of quickly returning to normal operation following emersion, i.e., returning to an established drag setting following exposure to water. Furthermore, the drag system of the present invention exhibits an ability to resist fatigue even through long hours of continuous use, i.e., maintains consistent drag all day long. These aspects of the drag system of the present invention resolve shortcomings of conventional fishing reel drag systems. While shown here in the context of a fly fishing reel, it will be understood that the drag system of the present invention may be applied to a variety of fishing reel types.

Figure 2:
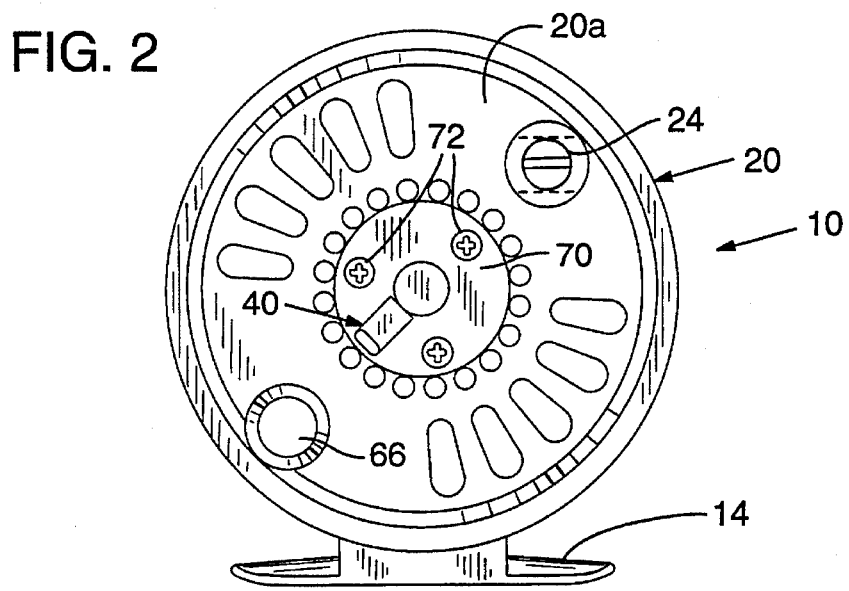
FIG. 2 is a side view of the fly reel of FIG. 1.

With reference to FIGS. 1 and 2, fishing reel 10 includes a drag system 12 according to a preferred embodiment of the present invention. Fishing reel 10 mounts at its foot 14 (FIG. 2) to a fishing rod 16 in conventional fashion. A fishing reel housing 18 fixedly attaches to foot 14 and remains stationary relatively to fishing rod 16. A spool 20 rotates about a main axis 22 relative to housing 18. Spool 20 includes a handle 24 rotatably mounted upon spool 20 and spaced radially from the main axis 22 whereby a user 26 (FIG. 1) may grasp handle 24 and rotate spool 20 relative to housing 18 to collect line 28 thereon.

Drag system 12 manages, i.e., limits, line tension 30 during line 28 windout. In particular, reel 10 offers a given magnitude resistance or drag in response to application of a deployment force 32 on fishing line 28. The higher the drag setting for drag system 12 the greater the line tension 30 allowed to develop. In accordance with the present invention, line tension 30 is substantially constant when overcoming static and dynamic friction conditions within drag system 12.

Figure 3:
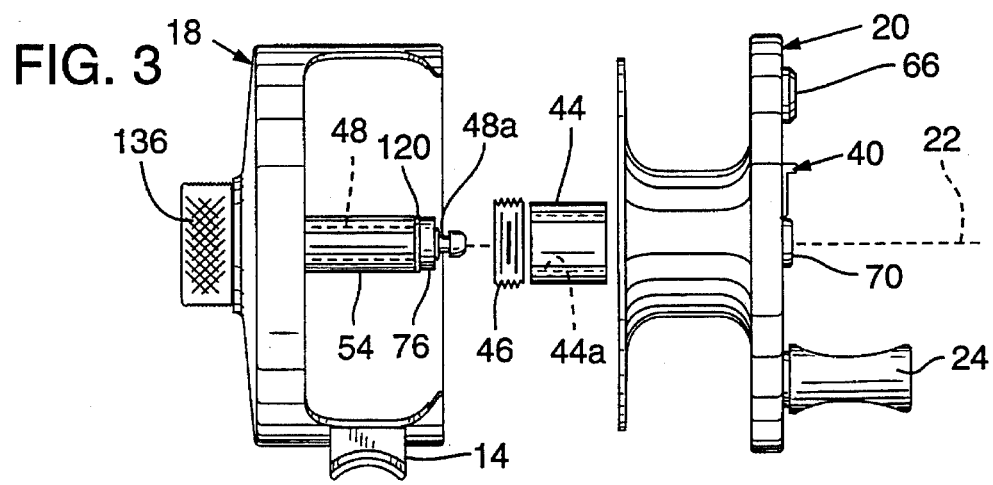
FIG. 3 shows the fly reel of FIG. 1 partially disassembled to illustrate the main components of reel housing and rotating spool.

Spool 20 is dismounted from housing 18 by operation of a spool lock 40. By sliding spool lock 40 radially outward relative to main axis 20, spool 20 is movable along axis 22 away from housing 18 as illustrated in FIG. 3. Spool 20 carries as its hub a one-way roller bearing 44 (shown removed in FIG. 3) held in place by an annular bearing nut 46. Nut 46 includes a central bore 46a leaving exposed the central bore 44a of bearing 44. Housing 18 provides a spindle 48 defining the main axis 22 of fishing reel 10. Spool 20 mounts by sliding central bore 44a of bearing 44 upon spindle 48 of housing 18. Spindle 48, mounted fixedly relative to housing 18, provides at its distal end an annular relief 48a for engagement by the spool lock 40 to capture spool 20 upon spindle 48.

Spindle 48 carries a drag sleeve 54. Drag sleeve 54 rotates upon the spindle 48 and engages the central bore 44a of one-way roller bearing 44. Thus, rotation of spool 20 in one direction is free spinning relative to sleeve 54, but in the opposite rotational direct engages sleeve 54 and urges sleeve 54 into rotation about spindle 48. In other words, during windout the roller bearing 44 engages sleeve 54 and urges sleeve 54 into rotation about spindle 48. During collection of line 28, however, bearing 44 is free spinning on sleeve 54 and exerts little or no torque on sleeve 54. Drag system 12 establishes a given magnitude resistance to rotation of sleeve 54 upon spindle 48, and thereby establishes drag with respect to spool 20 in a given rotational direction, with free spinning rotation of spool 20 allowed in the opposite rotational direction. As may be appreciated, by removing bearing 44 from spool 20 and flipping bearing 44 end-for-end, fishing reel 10 may be quickly and easily converted from a right-hand retrieve fishing reel to a left-hand retrieve fishing reel.

Figure 4:
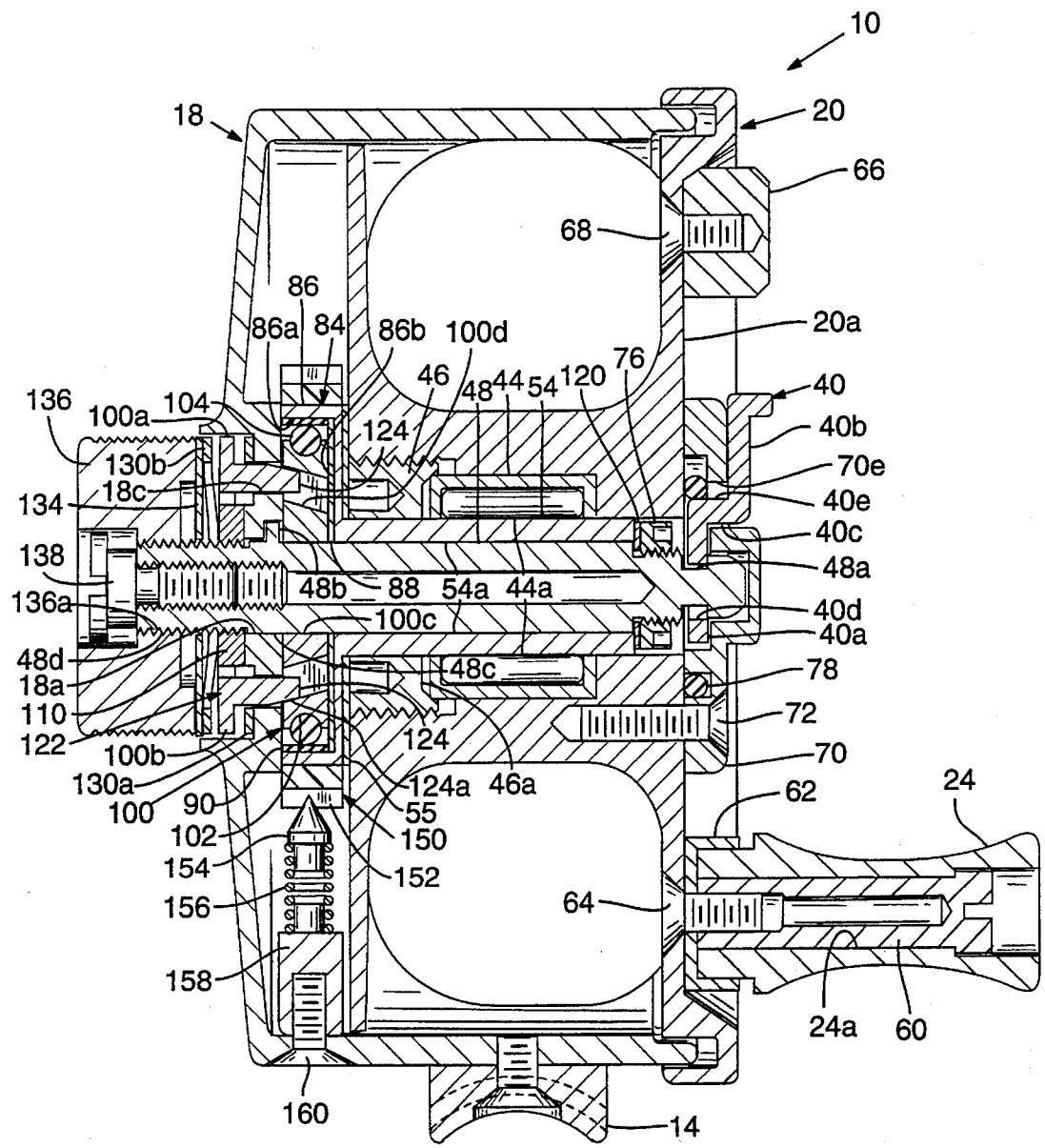
FIG. 4 is a sectional view of the fly fishing reel of FIG. 1 as taken along lines 4—4 of FIG. 1.

FIGS. 4 and 5 illustrate in more detail the fly fishing reel 10 of FIGS. 1–3. FIG. 4 shows in cross section the assembled fishing reel 10 while FIG. 5 shows an exploded perspective assembly view of the fishing reel 10.

In FIGS. 4 and 5, spool 20 is shown including the handle 24 mounted rotatably thereon by means of a handle bushing 60 resting coaxially within the bore 24a of handle 24 and abutting a cup washer 62. A handle screw 64 passes through wall 20a of spool 20 and cup washer 62 and threadably engages the handle bushing 60. In this manner, handle 24 is rotatably mounted upon spool 20. A counter-balance weight 66 mounts to wall 20a by way of screw 68 extending through wall 20a. In this manner, counter-balance 66 offsets the weight of handle 24 on spool 20 for better stability during rotation of spool 20.

A locking plate 70 attaches by way of plate screws 72 upon the exterior surface of wall 20a. Spool lock 40 includes an interior portion 40a and an exterior portion 40b. Locking plate 70 includes a slotted aperture 70a in which a coupling portion 40c of spool lock 40 rests. Locking plate 70 includes guide ways (not shown) for constraining movement of spool lock 40 along a radial path. Spool lock 40 includes an aperture 40d in interior portion 40a aligned generally with the main axis 22, but slidable radially relative thereto by means of guide ways (not shown) of locking plate 70. With the interior portion 40a of lock 40, including the aperture 40d, captured between locking plate 70 and wall 20a, a shoulder 40e of spool lock 40 engages the inner diameter of an O-ring 78 also captured between plate 70 and wall 20a. O-ring 78 provides a biasing force to bring the aperture 40d of spool lock 40 radially away from alignment with main axis 22. In this manner, the relief 48a of spindle 48 may pass into aperture 40d when aperture 40d is aligned with axis 22, and be locked in place by releasing lock 40 following inward movement of spool lock 40 under the influence of O-ring 78. As previously noted, by applying a radially outward directed force on spool lock 40, i.e., against the biasing force of O-ring 78, the aperture 40d is aligned with main axis 22 and spindle 48 whereby spool 20 may be slidably removed from spindle 48.

Drag sleeve 54 is an integral portion of a drag housing 84. As previously noted, the inner bore 54a of drag sleeve 54 rests coaxially upon the spindle 48. A drum 86, of relatively greater diameter with respect to sleeve 54, is formed integrally with the sleeve 54. Drum 86 (shown partially broken away in FIG. 5) defines a cylindric inner drum surface 86a. A floor 86b of drum 86 receives thereagainst a ultra high molecular washer 88. A cylindric drag strip 90, also of UHMW material, rests along the inner drum surface 86a. Thus, the interior surfaces of drum structure 86 are protected by UHMW washer 88 and UHMW drag strip 90.

A drag expander 100, including an upper portion 100a and a lower portion 100b, defines generally a bifurcated disk including a circumferential O-ring site 102. An O-ring 104 rests circumferentially about drag expander 100 at the site 102. With the O-ring 104 resting at site 102, and the expander portions 100a and 100b being thereby drawn together toward main axis 22, the assembly of expander 100 and O-ring 104 may be placed within the drum 86. In particular, the O-ring 104 circumferentially engages the drag strip 90 and the leading face of expander 100 rests against the washer 88. Drag expander 100 defines a central bore 100c through which the spindle 48 slides in mounting drag housing 84 upon spindle 48. In such configuration, moving the expanders 100 radially outward causes O-ring 104 to bear against drag strip 90 within drum housing 86. As may be appreciated, to the extent that expander portions 100a and 100b are radially separated a larger magnitude frictional relationship exists between the drag expander 100 and the drag housing 84. As will be explained more fully hereafter, the drag expander 100 is held against rotation about the main axis 22 and the frictional relationship between drag expander 100 and the rotating drag housing 84 establishes a given drag setting for drag system 12.

Spindle 48 mounts fixedly to the reel housing 18 by means of a drag nut 110 threadably engaging spindle 48 and capturing therebetween reel housing 18. More particularly, a central bore 18a of housing 18 receives the threaded proximal end of spindle 48. Nut 110 then threads upon spindle 48 to secure spindle 48 upon housing 18. Also, spindle 48 includes a shoulder 48b including a flat portion 48c fitting closely within the aperture 18a of housing 18, also including a corresponding flat portion 18b. In this manner, spindle 48 is held securely against rotation as mounted fixedly upon housing 18 and defining the main axis 22.

The assembly of drag housing 84, washer 88, drag strip 90, drag expander 100, and O-ring 104 mounts coaxially upon spindle 48 by sliding onto the distal end thereof. Once so positioned on spindle 48, a washer 120 slides into abutting contact with the distal end of sleeve 54 and a lock nut 76 threads upon spindle 48 to hold drag housing 84 against movement axially along the spindle 48 and toward its distal end at the relief 48a. In other words, the lock nut 76 captures drag housing 84 against coming off the end of spindle 48. A UHMW washer 55 may be placed coaxially upon sleeve 54 and against the drum 86 as an interface between drag housing 84 and spool 20.

In such configuration, i.e., with the drag housing 84 blocked against movement off the spindle 48 by means of lock nut 76, drag system 12 further provides a mechanism for bearing against the expander 100 to cause outward radial movement of expander portions 100a and 100b, and thereby establish a given magnitude frictional relationship between drag expander 100 and drag housing 84. More particularly, a drag spreader 122 projects spreader legs 124, each including surfaces 124a inclined downward toward main axis 22 in the direction of drag expander 100, into expander 100. Drag expander 100 includes inclined apertures 100d similarly inclined downward toward main axis 22 in the direction of drag housing 84. The angle of inclination for apertures 100d and legs 124 may vary according to the range of drag desired, i.e., for a given angle of inclination for legs 124 and apertures 100d, a given range of drag is achieved. Thus, by varying the angle of inclination for legs 124 and apertures 100d relative to the axis 22, a selected range of drag results. As the drag spreader 122 is driven into the drag expander 100, i.e., the surfaces 124a of spreaders 124 enter the inclined apertures 100d of drag expander 100, the drag expander portions 100a and 100b are driven radially outward. Similarly, as the drag spreader 122 is withdrawn from the drag expander 100, the expander 100 contracts radially inward under the influence of O-ring 104.

A pair of wave springs 130, individually 130a and 130b, are positioned each adjacent the drag spreader 122, and a washer 134 is interposed between the upper wave spring 130a and the drag knob 136. A drag screw 138 is positioned coaxially along main axis 122, through the drag knob 136, washer 134, wave spring 130a, drag spreader 122, and wave spring 130b for threading engagement with the interior threaded aperture 48b of spindle 48. In this manner, the assembly of drag knob 136, washer 134, wave spring 130, drag spreader 122, and wave spring 130b are captured coaxially along main axis 22 with drag spreader 122 suitably positioned for engagement of drag expander 100. An inner bore 136a of drag knob 136 engages threaded portion 48d of spindle 48 so as to collapse the assembly against reel housing 18 and cause the spreader legs 124 to protrude through apertures 18c reel housing 18 and into the drag expander 100.

Thus, rotational movement of drag knob 136 accomplishes longitudinal movement of drag spreader 122 along axis 22 and thereby establishes a given radial outward or radial inward position for the drag expander portions 100a and 100b to establish a selected magnitude frictional relationship between the drag housing 84 and the drag expander 100. Because the drag spreader 122 is held against rotation, i.e., the spreader legs 124 pass through corresponding apertures 18c of reel housing 18, and the spreader legs 124 engage the inclined apertures 100d of drag expander 100, the drag expander 100 is held rotationally stationary relative to reel housing 18. In this manner, a magnitude of friction established between drag expander 100 and drag housing 84 dictates the amount of resistance to rotation about axis 22 offered by drag housing 84.

Drag system 12 exhibits as low as 0.007 drag coefficient making "start-up" drag practically non-existent. The circumferential drum arrangement of drag system 12 increases point contact expansion as the drag knob 136 is tightened. The drag established increases exponentially as the knob 136 is adjusted to provide a wide range of drag settings. Also, drag system 12 needs no predetermined, i.e., incremental, settings on the adjustment knob 136, but instead provides a true analog and wide range of drag settings. In this manner, the user can establish an ideal maximum line tension 30.

Most fishing reels provide an audible feedback to indicate to the user rotation of the spool. In the illustrated fishing reel 10, a clicker assembly 150 includes a spur gear 152 mounted circumferentially about the outer surface of drum 86, a clicker point 154 engaging the teeth of gear 152, a spring 156 upon which clicker point 154 mounts, a clicker body 158 upon which spring 156 mounts, and a screw 160 for attaching the body 158 to housing 18. As may be appreciated, the drag housing 84 moves only during windout of spool 20. During collection of line 28, the one-way roller bearing 44 rotates freely on the sleeve 54 and exerts little or no torque thereon. Accordingly, spur gear 152 rotates only during line 28 windout. As spur gear 152 rotates during windout, the clicker point 154 moves from tooth-to-tooth, thereby producing a clicking noise indicative of spool 20 windout. Thus, the clicker assembly 150 only produces audible indication of spool 20 rotation during line 28 windout, and not during line 28 collection.

Thus, an improved drag system for a fishing reel has been shown and described. The drag system of the present invention provides accurate and consistent drag performance as demanded by the most discriminating of all sports fishing activities, i.e., fly fishing. As may be appreciated by those persons experienced in fly fishing, every aspect of the equipment used and conditions prevailing must be considered in fully enjoying the fishing experience. The drag system of the present invention allows the user to fully enjoy the fishing experience by providing an accurate and reliable drag system accurately establishing a drag setting according to prevailing conditions and equipment used.

Consider a situation where the user is casting to selective wild trout on a smooth flowing spring creek. Conditions of the day call for 7× tippets and size 22 flies. The fish are large and breaking tippets all to often. The source of tip breakage is most likely found in the drag system of the reel. Unless the drag coefficient is low enough, the fish will break off at the strike because the reel requires a sharp jerk to overcome the breakaway, i.e., static, friction of the drag system. While large tippets could be used, the user would risk spooking the fish. A fishing reel employing the drag system of the present invention, however, has extremely low coefficient of drag and allows the user to continue using the 7× tippets as conditions demand. Because the drag system of the present invention has substantially consistent drag response from the onset of a deployment force and through line windout, no such sudden sharp jerk is required to overcome breakaway friction and the fishing line experiences no sudden sharp increase in tension. As a result, the risk of tippet breakage is substantially reduced even thought lighter gauge tippets are employed.

The weak point in most conventional fishing reel is the cork material used in the drag system. Cork offers a relatively high drag coefficient, and cannot permit smooth, i.e., consistent, drag resistance in response to a deployment force. This can be particularly critical when fishing for long-running game fish like bone fish and rugged species. In such sport, the user doesn't simply reel in the fish. It is necessary to battle the fish for every foot of line. During such battle, the line experiences sudden increases in tension corresponding to the onset of windout. With a drag system of the present invention, the drag setting may be appropriate for both the onset of windout and during windout. In this manner, a more precise drag setting appropriate for the current conditions may be achieved without risking damage to the fishing rod or loss of game.

It will be appreciated that the present invention is not restricted to the particular embodiment that has been described and illustrated, and that variations may be made therein without departing from the scope of the invention as found in the appended claims and equivalents thereof.

What is claimed is:

1. In a fishing reel, a drag system comprising:

a housing and a fishing reel spool rotatively mounted to the housing;

a drum element defining a peripheral interior drum surface;

a radially outward expanding expansion element within said drum element including a peripheral edge portion engaging said inner drum surface upon radial expansion thereof, and one of said drum element and expansion element coupled to said housing and the other coupled to said spool;

said drum surface provided with a low co-efficient of friction and said peripheral edge portion provided with an elastomeric material that substantially conforms to the peripheral interior drum surface upon engagement therewith whereby dynamic and static friction as between the drum surface and elastomeric material are substantially equal; and an adjustment mechanism determining the magnitude of expansion of said expansion element whereby upon expansion of said expansion element to frictionally engage the inner surface of said drum element a magnitude of drag against rotation of said drum element relative to said fishing reel is established.

2. A drag system as defined in claim 1 wherein said expansion element comprises separable segments banded together with an elastomeric ring providing said peripheral edge portion.

3. A drag system as defined in claim 2 wherein said drag system produces a drag co-efficient of about 0.007.

4. A drag system as defined in claim 2 wherein the drum surface is covered with a strip of material having an ultra high molecular weight (UHMW).

5. In a fishing reel, a drag system comprising:

a non-rotatable spindle;

a drum element defining an interior drum surface and rotatably coupled to the spindle;

a radially outward expanding expansion element non-rotatably mounted to said spindle within said drum element and engaging said inner drum surface upon radial expansion thereof;

an adjustment mechanism mechanically coupled to said expansion element controllably determining the magnitude of expansion of said expansion element whereby upon expansion of said expansion element to frictionally engage the inner surface of said drum element a desired magnitude of drag against rotation of said drum element relative to said spindle is established; and a drag sleeve rotatable with said drum element, a spool and a one-way clutch mechanism mounting said spool to the drag sleeve for free rotation in one direction only relative to the drag sleeve.

6. A drag system as defined in claim 5 wherein said expansion element comprises separable segments cooperatively defining a periphery and an elastic ring mounted on said periphery urging said segments together, said elastic ring urged into engagement with the drum interior by forced separation of the segments by said adjustment mechanism.

7. A drag system as defined in claim 6 wherein said one-way clutch mechanism is reversibly mountable to said sleeve for reversing the direction of permitted free rotation of the spool on the sleeve.

* * * * *